United States Patent [19]
Withycombe et al.

[11] 4,260,641
[45] * Apr. 7, 1981

[54] MIXTURES CONTAINING ISOBUTYL SUBSTITUTED HETEROCYCLIC COMPOUNDS AND FLAVOR USE THEREOF

[75] Inventors: Donald A. Withycombe, Lincroft; Braja D. Mookherjee, Holmdel; Manfred H. Vock, Locust; Joaquin F. Vinals, Red Bank, all of N.J.

[73] Assignee: International Flavors & Fragrances Inc., New York, N.Y.

[*] Notice: The portion of the term of this patent subsequent to Jun. 6, 1995, has been disclaimed.

[21] Appl. No.: 67,370

[22] Filed: Aug. 17, 1979

Related U.S. Application Data

[60] Continuation-in-part of Ser. No. 887,623, Mar. 17, 1978, abandoned, which is a division of Ser. No. 807,056, Jun. 16, 1977, Pat. No. 4,093,752.

[51] Int. Cl.³ .............................................. A23L 1/234
[52] U.S. Cl. ................................... 426/536; 426/537; 426/533; 548/239
[58] Field of Search ............... 548/239; 426/533, 537, 426/536

[56] References Cited

U.S. PATENT DOCUMENTS

| | | | |
|---|---|---|---|
| 3,627,540 | 12/1971 | Katz et al. | 548/239 X |
| 3,769,293 | 10/1973 | Hetzel et al. | 548/239 |
| 4,093,752 | 6/1978 | Withycombe et al. | 426/536 |
| 4,191,785 | 3/1980 | Withycombe et al. | 426/537 X |

Primary Examiner—Joseph M. Golian
Attorney, Agent, or Firm—Arthur L. Liberman

[57] ABSTRACT

Foodstuff flavor and aroma augmenting and enhancing compositions are described containing compositions of matter which include a mixture of (i) 2,4,6-triisobutyl-1,3,5-trioxane and (ii) two 2-isobutyl dialkyloxazolines having the generic structure:

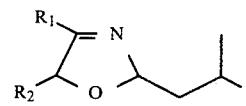

wherein $R_1$ and $R_2$ are different and each represents ethyl or methyl. Addition of such mixtures to foodstuffs produces chocolate-like, nutty, green, burnt, roasted aromas and tastes. The above-mentioned mixture can only properly be defined by its process for producing same. That is, admixing aqueous ammonia with isovaleraldehyde at a temperature in the range of from about 0° C. up to about 10° C. whereby the reaction of aqueous ammonia with isovaleraldehyde is carried out, using a mole ratio of isovaleraldehyde: ammonia of from 0.5:1 up to 2:1 thereby producing an imine; then reacting the resulting imine with 2-hydroxy-3-pentanone 3-hydroxy-2-pentanone or a mixture thereof at a temperature in the range of from about 30° C. up to about 50° C. over a period of time of from 1 up to 10 hours.

3 Claims, 9 Drawing Figures

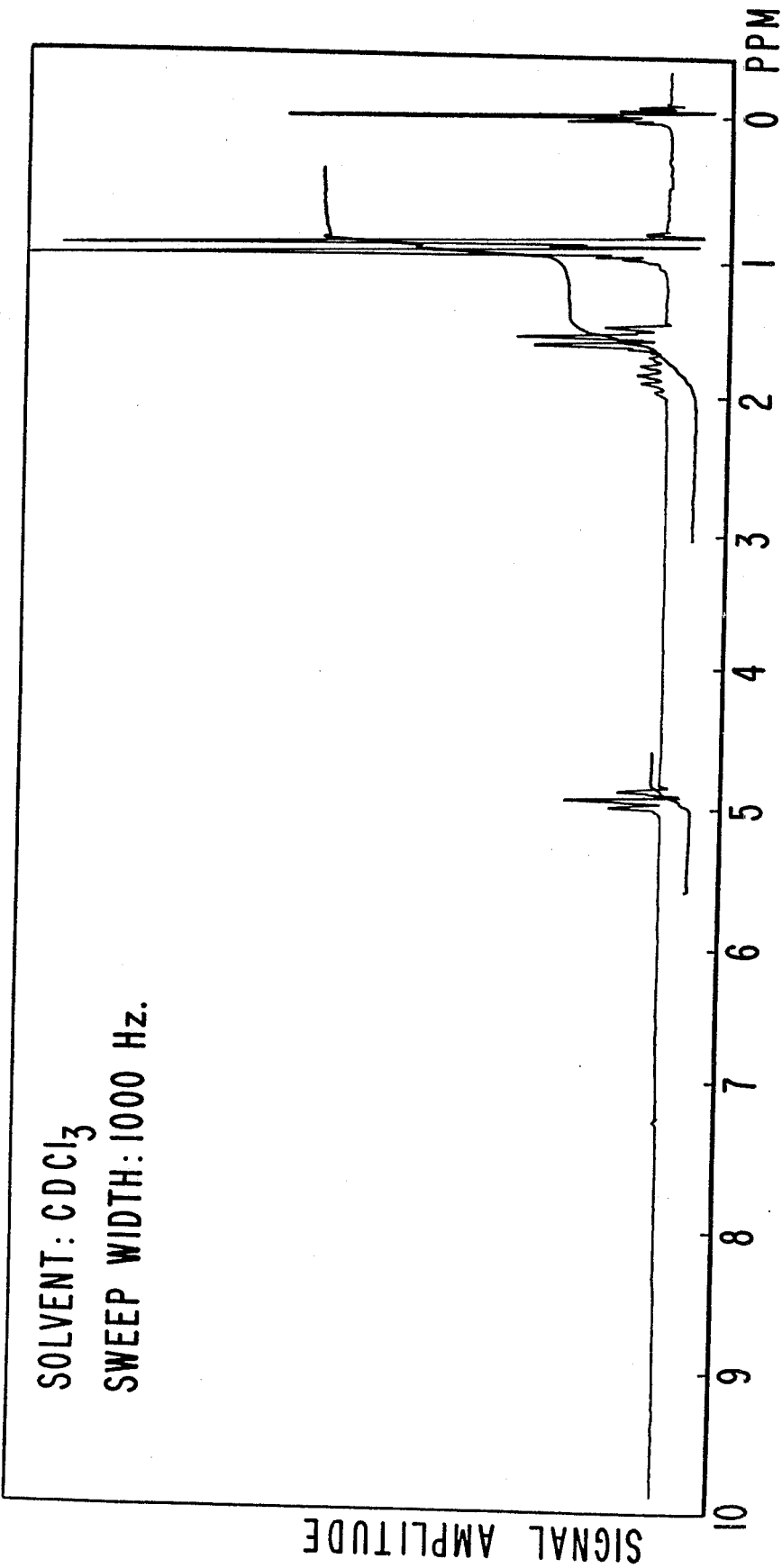

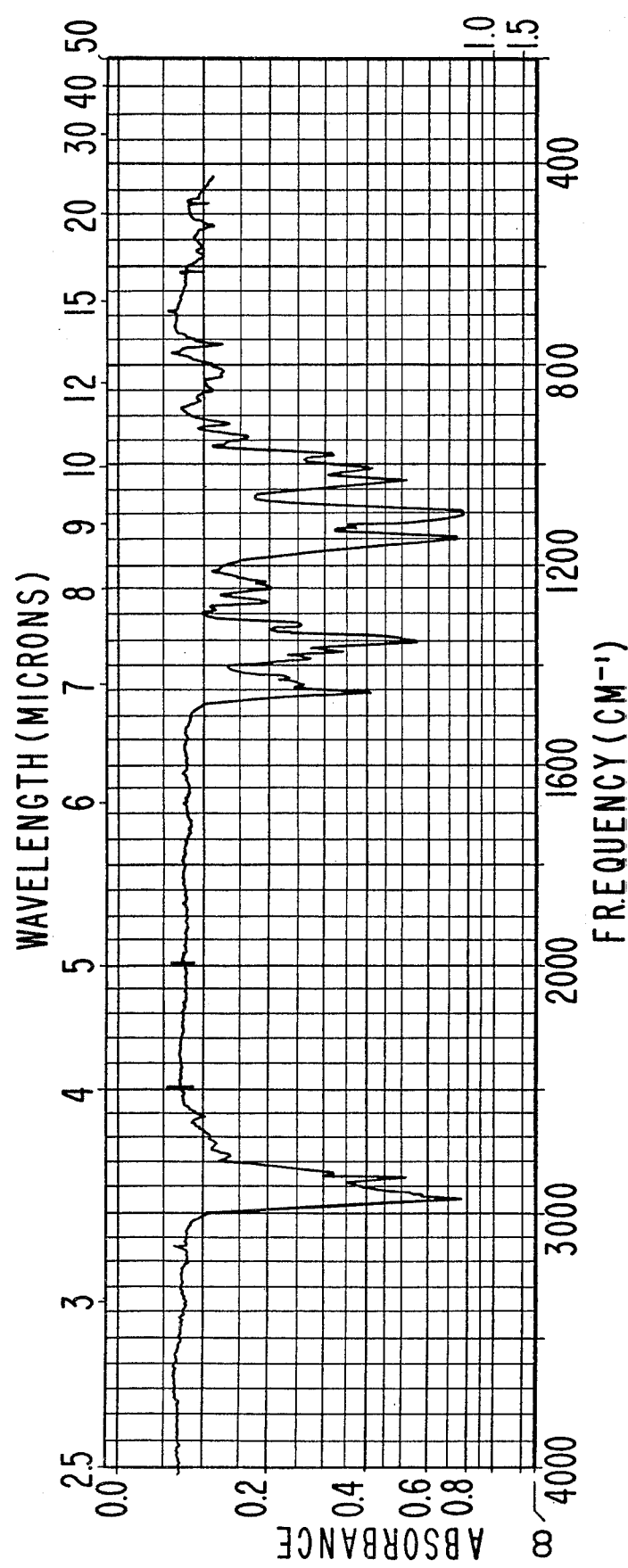

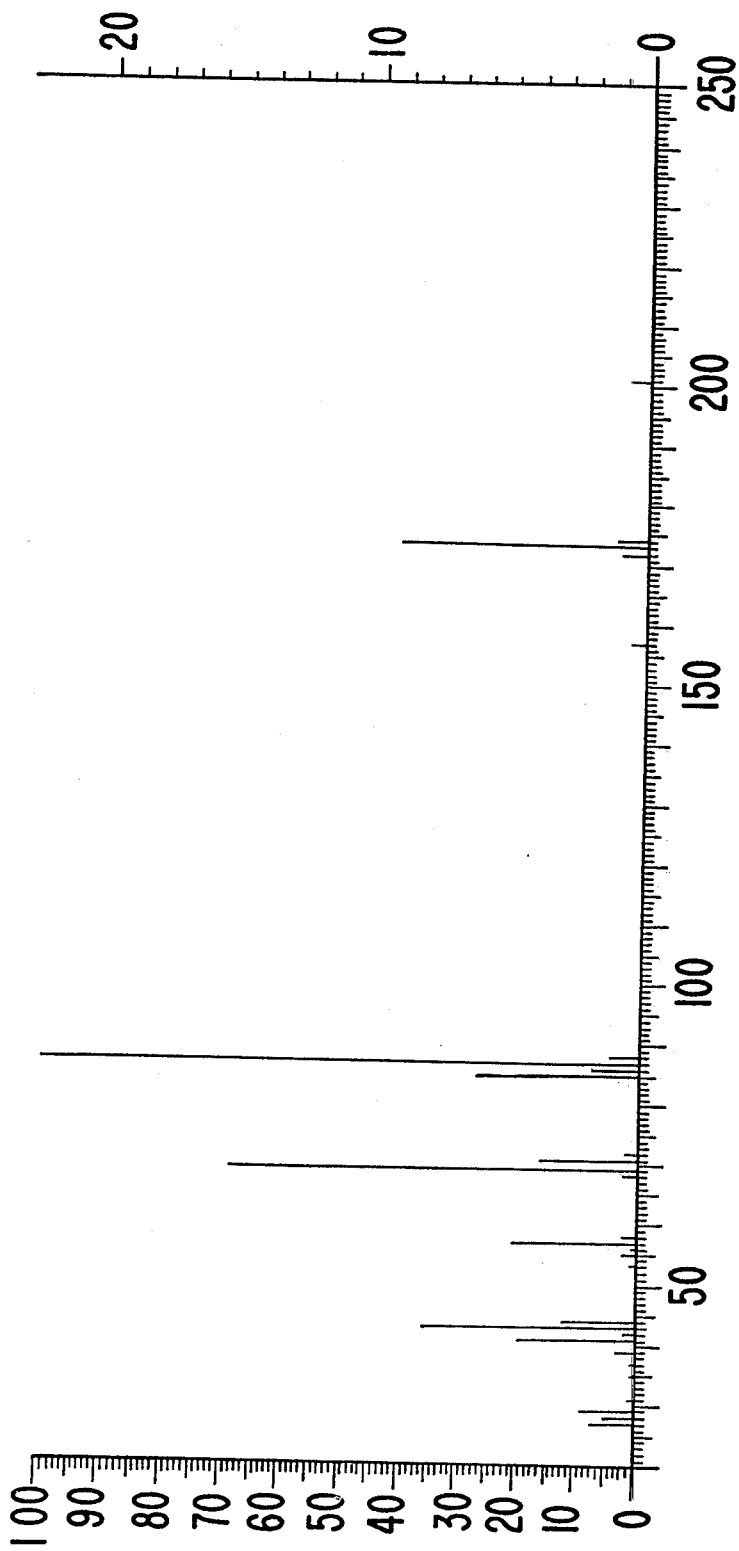
FIG.3 MASS SPECTRUM FOR EXAMPLE I

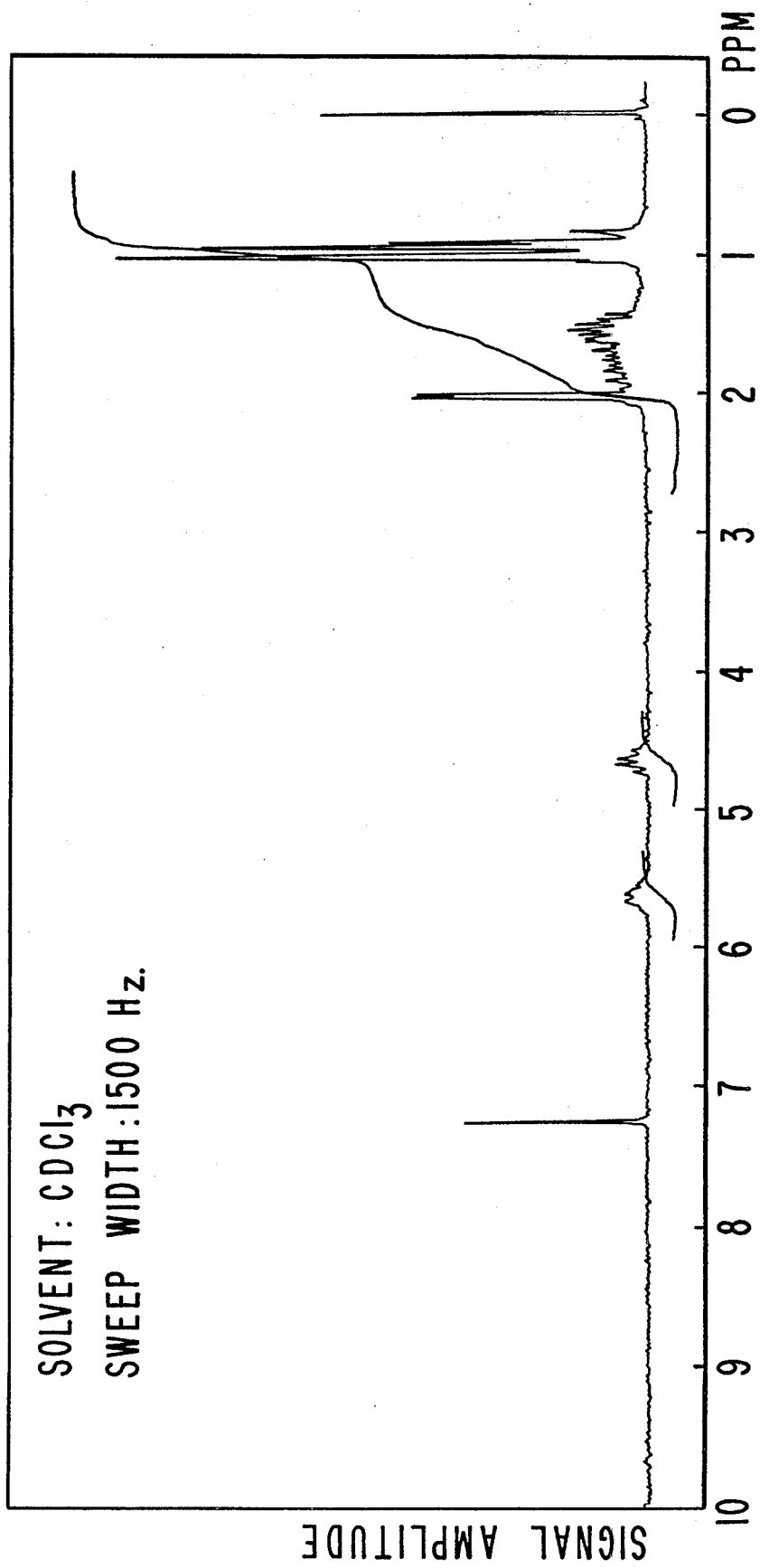

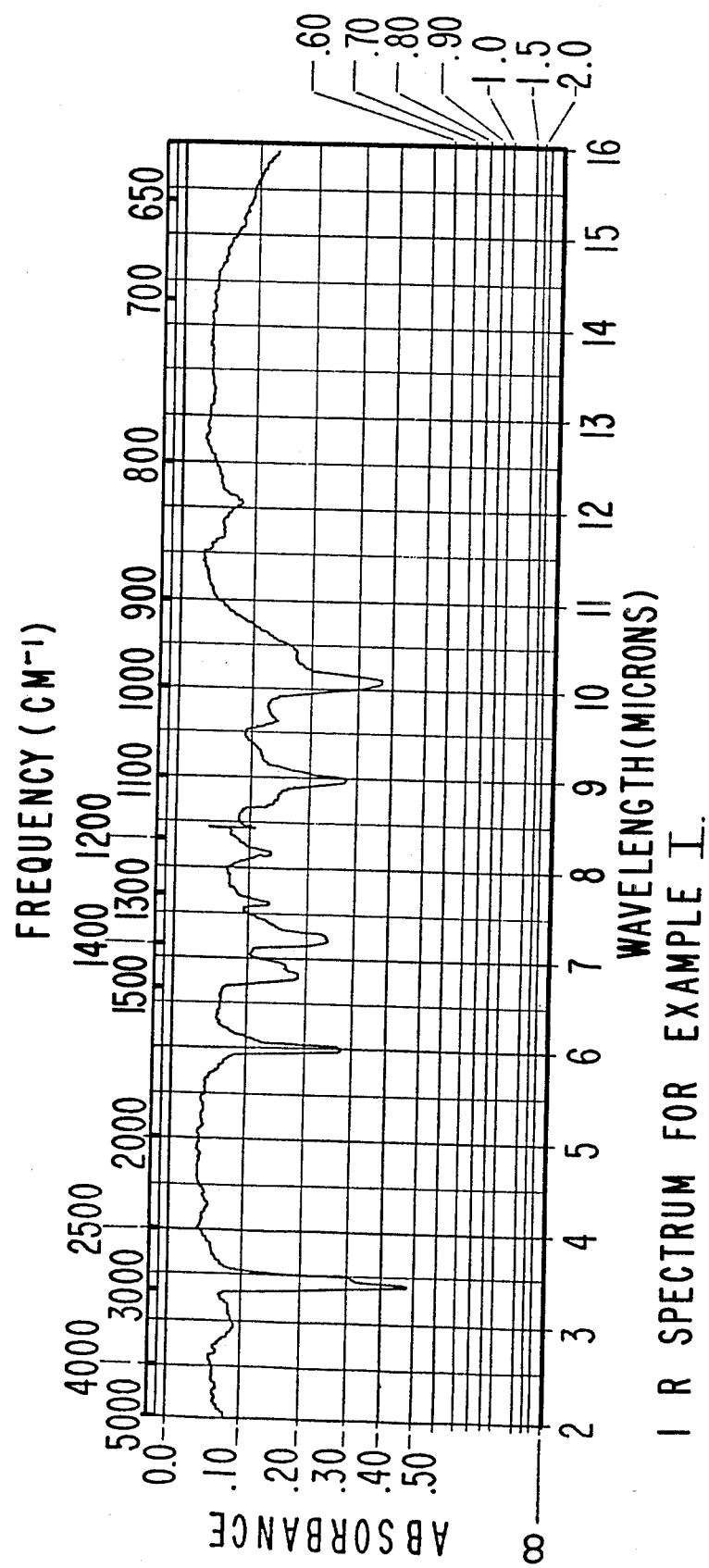
FIG.5 IR SPECTRUM FOR EXAMPLE I.

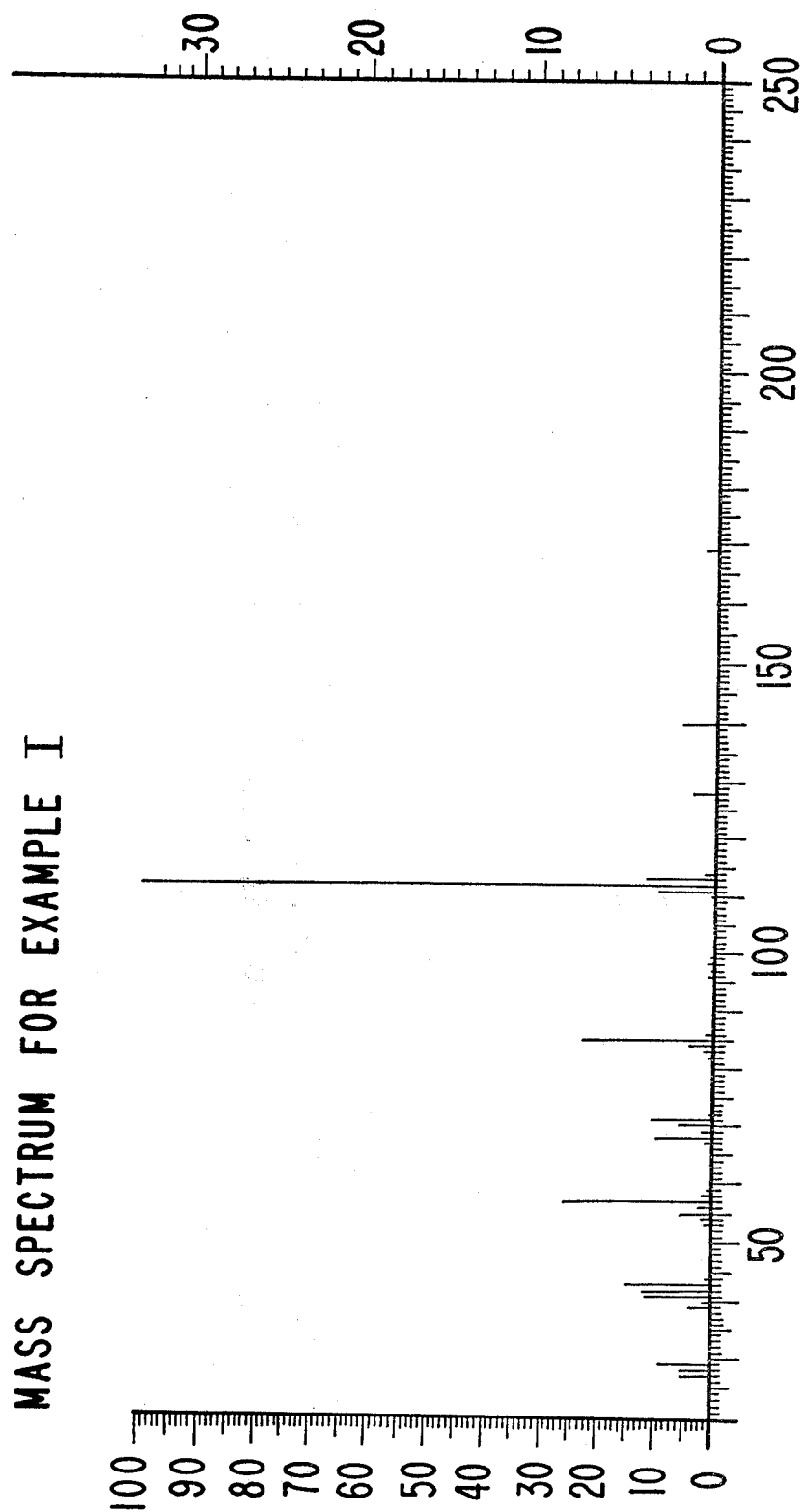

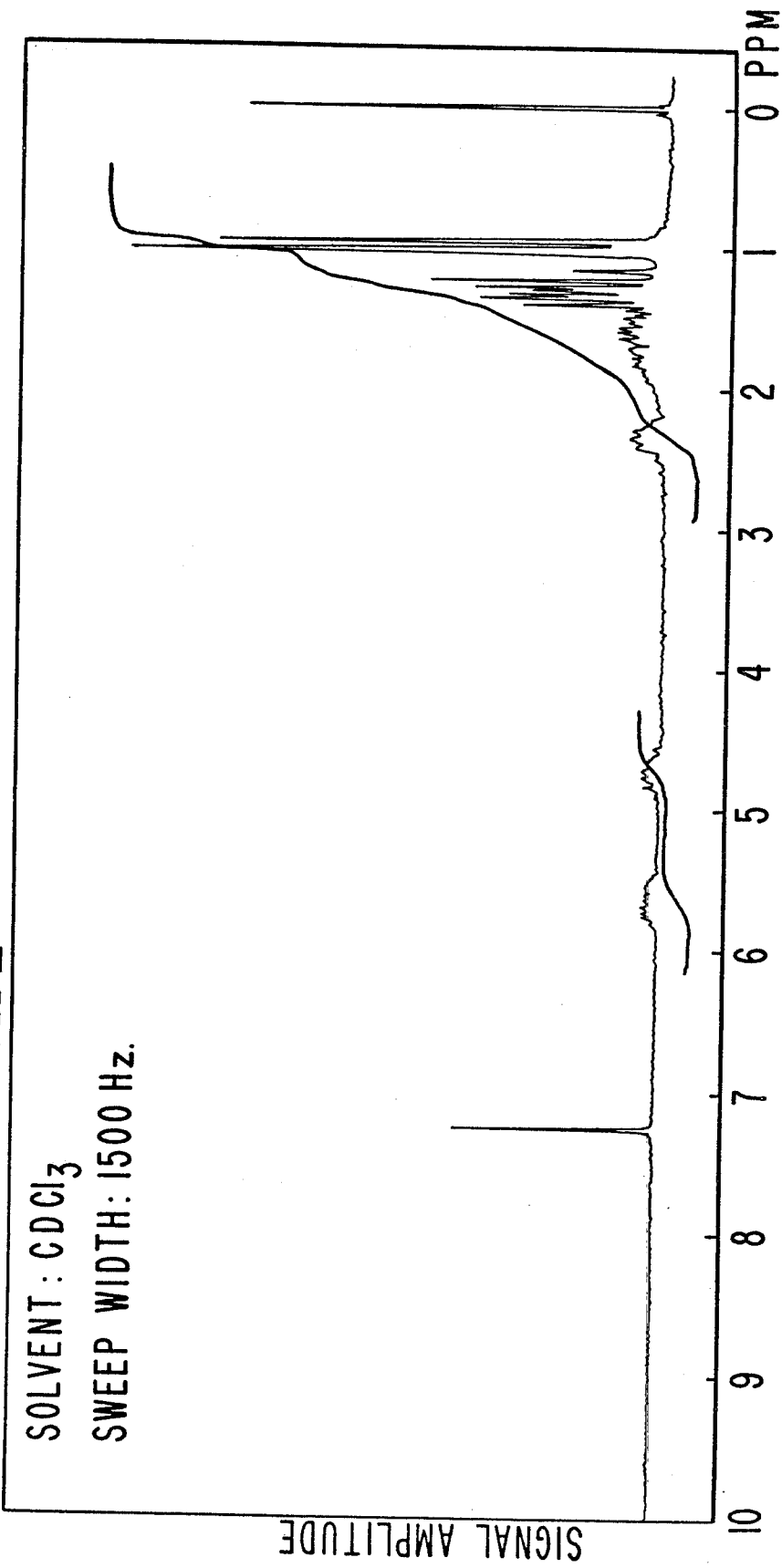

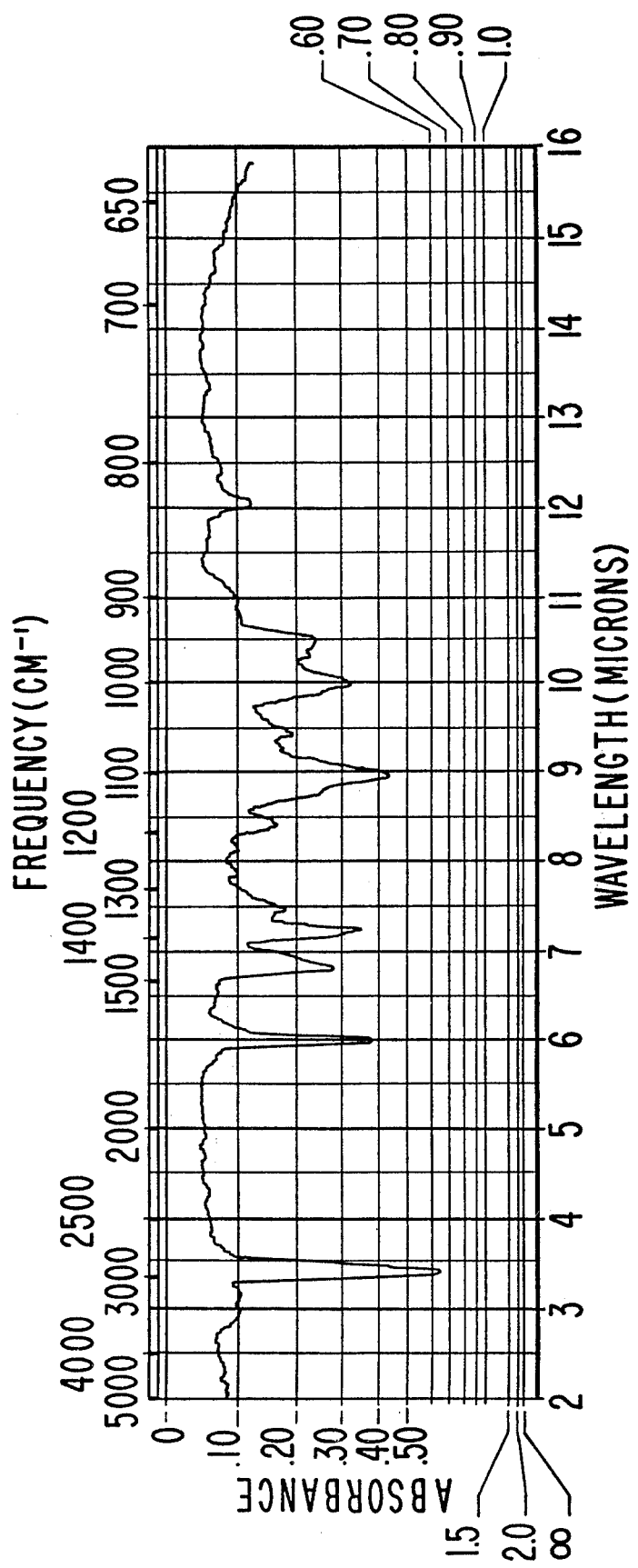

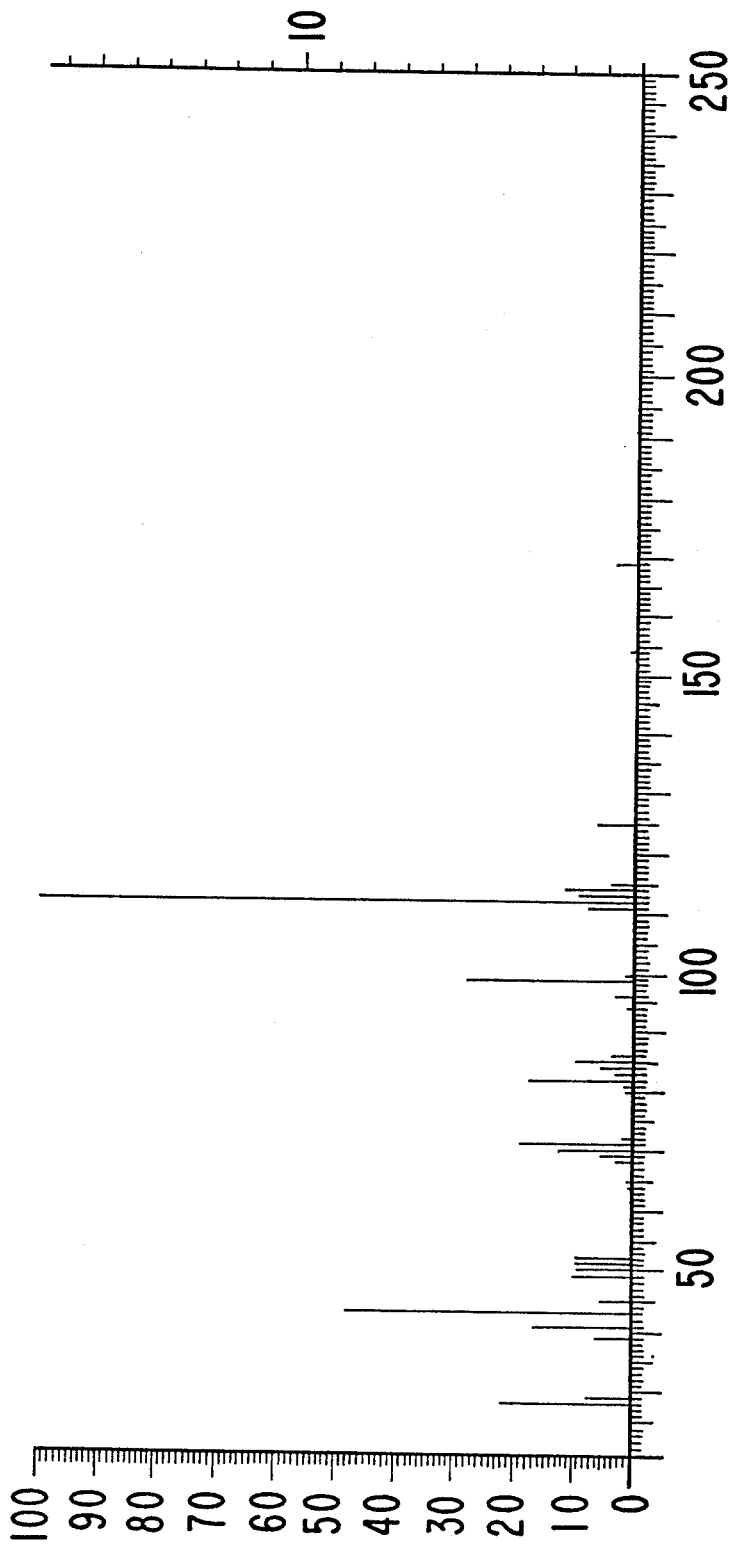

MIXTURES CONTAINING ISOBUTYL SUBSTITUTED HETEROCYCLIC COMPOUNDS AND FLAVOR USE THEREOF

This application is a continuation-in-part of Application for U.S. Ser. No. 887,623, filed on March 17, 1978 now abandoned which, in turn, is a divisional of application for U.S. Ser. No. 807,056, filed on June 16, 1977, now U.S. Pat. No. 4,093,752 issued on June 6, 1978.

BACKGROUND OF THE INVENTION

The present invention relates to a mixture of compounds including three compounds, specifically and several other unknown compounds. The three specific known compounds in the mixture are:

(i) 2,4,6-triisobutyl-1,3,5-trioxane; having the structure:

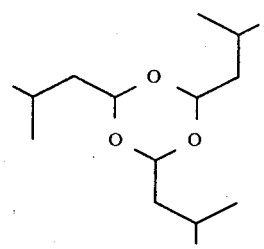

(ii) 2-isobutyl-4-methyl-5-ethyloxazoline and 2-isobutyl-4-ethyl-5-methyl oxazoline, each of the compounds covering by the generic formula:

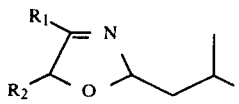

wherein $R_1$ and $R_2$ are different and each represents ethyl and methyl
and the use of such mixture for augmenting or enhancing the flavor or aroma of foodstuffs particularly cocoa flavored foodstuffs. The mixtures containing the three specific compounds above mentioned is prepared by admixing aqueous ammonia with isovaleraldehyde at a temperature in the range of from about 0° C. up to about 10° C. whereby the reaction of aqueous ammonia with isovaleraldehyde is carried out using a mole ratio of isovaleraldehyde: ammonia of from 0.5:1 up to 2:1 thereby producing an imine; then reacting the resulting imine with 2-hydroxy-3-pentanone or 3-hydroxy-2-pentanone or a mixture thereof at a temperature in the range of from about 30° C. up to about 50° C. over a period of time of from 1 up to 10 hours.

There has been considerable work performed relating to substances which can be used to impart (modify, augment or enhance) flavors and aromas to (or in) foodstuffs having chocolate flavors with nutty, green and burnt, roasted flavors. These substances are used to diminish the use of natural materials, some of which may be in short supply and to provide more uniform properties in the finished product. Thus, chocolate-like, nutty, green, burnt and roasted-like aromas and flavors are particularly desirable for many uses in foodstuff flavors, particularly chocolate flavors.

German Auslegschrift No. 2,402,416 discloses a sublimable perfumed composition in tablet form containing 1,3,5-triisopropyl-s-trioxane or 1,3,5-tri-t-butyl-s-trioxane as an active agent whereby the composition may be used to deodorize toilets, telephone mouthpieces, or give off insecticides.

2,4,6-Tri-s-butyl-1,3,5-trioxane is disclosed at volumne 19, page 391 of Beilstein; and it is further disclosed to be a "trimer" of methyl ethyl acetaldehyde (2-methyl butanal). An additional disclosure in Beilstein is at Volumn 19, supplement 2 at page 403. Neither Beilstein reference discloses the organoleptic qualities of 2,4,6-triisobutyl-1,3,5-trioxane nor is the usefulness of its presence in mixtures containing oxazolines and other materials disclosed or inferred.

Indeed, the 1,3,5-triisopropyl-s-trioxane has little, if any, aroma or flavor to be of value in flavoring foodstuffs. It is, accordingly, quite surprising that the next adjacent methyl homologue, 2,4,6-triisobutyl-1,3,5-trioxane, has such intense aroma and flavor nuances particularly when in admixture with oxazolines in the mixture of our invention.

Trialkyl substituted oxazolines are described in the prior art as being useful for modifying fish flavors in U.S. Pat. No. 3,627,540 issued on Dec. 14, 1971. More specifically, it is stated at Column 2, lines 12–27:

The seafood flavor characteristic of the pentadienal can further be varied by including one or more cyclic oxazo compounds, particularly $\Delta^3$-oxazolines having the formula

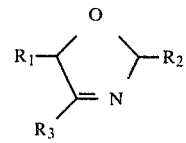

wherein $R_1$, $R_2$ and $R_3$ are hydrogen, alkyl, or alkylene and can be the same or different. It is preferred in certain embodiments of the present invention to use lower alkyl derivatives of oxazoline, preferably those having up to about three carbon atoms in the alkyl group or groups. A preferred oxazoline in certain embodiments of the invention is 2,4,5-trimethyl-$\Delta^3$-oxazoline.

U.S. Pat. No. 3,627,540 does not imply, however, that the higher alkyl oxazoline analogue of the instant invention taken together with 2,4,6-triisobutyl-1,3,5-trioxane of our invention, have flavor and aroma nuances of such quality and intensity as described herein.

Mussinan et al, "Identification and Flavor Properties of Some 3-Oxazolines and 3-Thiazolines Isolated from Cooked Beef," *Abstracts of Papers*, 170th Meeting, American Chemical Society, Aug. 24–29, 1975, Port City Press, Baltimore, Md., Item No. AGFD 022, stated:

22. IDENTIFICATION AND FLAVOR PROPERTIES OF SOME 3-OXAZOLINES AND 3-THIAZOLINES ISOLATED FROM COOKED BEEF. Cynthia J. Mussinan, Richard A. Wilson, Ira Katz, Anne Sanderson, and Manfred H. Vock. International Flavors and Fragrances, Inc., 1515 Highway 36, Union Beach, New Jersey 07735.

Four 3-oxazolines and two 3-thiazolines have been isolated from beef cooked in a sealed stainless steel vessel at 162.7 and 182°. The compounds were identified by matching retention times and mass spectra with those of authentic compounds synthesized in our laboratory. The compounds identified were 2,4-dimethyl-3-oxazoline; 2,4,5-trimethyl-3-oxazoline; 2,4-dimethyl-5-ethyl-3-oxazoline; 2,5-dimethyl-4-ethyl-3-oxazoline; 2,4-dimethyl-3-thiazoline; and 2,4,5-trimethyl-3-thiazoline. The synthesis, spectra and flavor properties of these and some related compounds will be discussed.

None of the oxazoline compounds of Mussinan et al. have properties even remotely similar to those of the compounds containing the oxazoline moieties contained in the product-by-process of our invention. Thus, the compounds containing the oxazoline moieties included in the mixtures of our invention have aid in causing the mixtures of our invention to have unexpected, unobvious and advantageous properties with respect to their organoleptic characteristics when compared with the oxazolines of Mussinan et al. and U.S. Pat. No. 3,627,540.

BRIEF DESCRIPTION OF THE DRAWINGS

FIG. 1 represents the NMR spectrum for 2,4,6-triisobutyl-1,3,5-trioxane produced according to Example I.

FIG. 2 represents the infrared spectrum for 2,4,6-triisobutyl-1,3,5-trioxane produced according to Example I.

FIG. 3 represents the mass spectrum for 2,4,6-triisobutyl-1,3,5-trioxane produced according to Example I.

FIG. 4 represents the NMR spectrum for 5-ethyl-4-methyl-2-isobutyl-3-oxazoline (fraction 2–5, peak 2) produced according to Example II.

FIG. 5 represents the infrared spectrum for 5-ethyl-4-methyl-2-isobutyl-3-oxazoline (fraction 2–5, peak 2) produced according to Example II.

FIG. 6 represents the mass spectrum for 5-ethyl-4-methyl-2-isobutyl-3-oxazoline produced according to Example II.

FIG. 7 represents the NMR spectrum for 4-ethyl-5-methyl-2-isobutyl-3-oxazoline (fraction 2–5, peak 1) produced according to Example II.

FIG. 8 represents the infrared spectrum for 4-ethyl-5-methyl-2-isobutyl-3-oxazoline (fraction 2–5, peak 1) produced according to Example II.

FIG. 9 represents the mass spectrum for 4-ethyl-5-methyl-2-isobutyl-3-oxazoline produced according to Example II.

THE INVENTION

It has now been discovered that novel solid and liquid foodstuff, compositions and flavoring compositions therefor having chocolate-like, cocoa-like, nutty, green, burnt roasted, and sweet aromas and tastes may be provided by the utilization of a mixture of compounds containing specifically (i) 2,4,6-triisobutyl-1,3,5-trioxane having the structure:

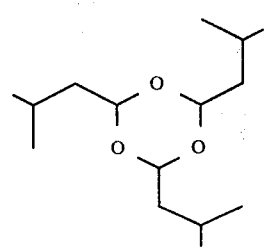

and (ii) 2-isobutyl-dialkyl oxazolines (two different compounds) having the generic structure:

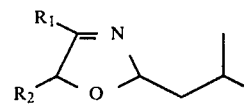

wherein $R_1$ and $R_2$ are different and each are selected from the group consisting of methyl and ethyl in foodstuffs.

The mixture of our invention including the 2,4,6-triisobutyl-1,3,5-trioxane and isobutyl-dialkyl is prepared by a novel process which involves first reacting isovaleraldehyde with aqueous ammonia to form the isovaleraldehyde imine and then reacting the resulting isovaleraldehyde imine with 2-hydroxy-3-pentanone or 3-hydroxy-2-pentanone or a mixture of 2-hydroxy-3-pentanone and 3-hydroxy-2-pentanone to form a mixture of oxazolines as well as 2,4,6-triisobutyl-1,3,5-trioxane and other compounds according to the following sequence:

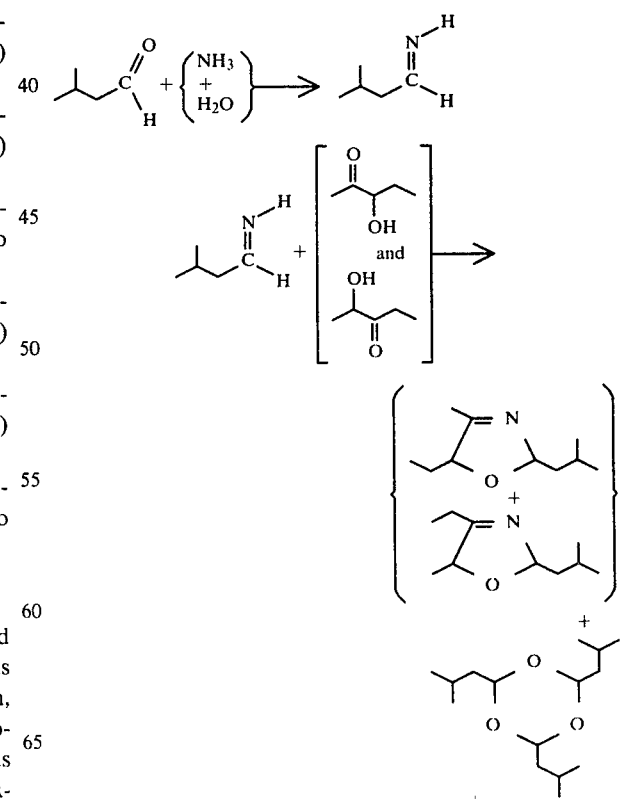

The first reaction, that of aqueous ammonia with isovaleraldehyde, preferably takes place at a temperature in the range of from about 0° C. up to about 10° C. It is most convenient and most preferable to carry out the reaction using a mole ratio of ammonia:isovaleraldehyde of 1:1 although mole ratios of from 0.5:1 up to 2:1 of isovaleraldehyde: ammonia may be used.

The resulting imine may then be reacted with either 2-hydroxy-3-pentanone or 3-hydroxy-2-pentanone or a mixture thereof. This reaction preferably takes place at a temperature in the range of from about 30° C. up to about 50° C. with a preferable temperature range of from 35° up to 40° C. The time of reaction varies with the temperature with the shorter times of reaction being satisfactory if greater temperatures of reaction are used. The most preferred time of reaction is 2 hours using a temperature of from 35°–40° C., but times of reaction of from 1 up to 10 hours are useful.

At the end of the second reaction, the reaction mass is extracted with an inert solvent such as diethyl ether, and the organic extract is evaporated and the resulting material is used in order to augment or enhance the aroma or taste of foodstuffs or foodstuff flavors.

The resulting mixture has a chocolate-like, nutty, green, burnt roasted-like aroma and taste. These unique nuances make it particularly suitable for use in cocoa and chocolate flavors.

When the product-by-process containing the isobutyl substituted heterocyclic compounds of our invention are used as a food flavor adjuvant, the nature of the co-ingredients included with the said mixture in formulating the product composition will also serve to alter, modify, augment or enhance the organoleptic characteristics of the ultimate foodstuff treated therewith.

As used herein in regard to flavors, the terms "alter", "modify" and "augment" in their various forms mean "supplying or imparting flavor character or note to otherwise bland, relatively tasteless substances or augmenting the existing flavor characteristic where a natural flavor is deficient in some regard or supplementing the existing flavor impression to modify its quality, character or taste".

The term "enhance" is used herein to mean the intensification of a flavor or aroma characteristic or note without the modification of the quality thereof. Thus, "enhancement" of a flavor or aroma means that the enhancement agent does not add any additional flavor note.

As used herein, the term "foodstuff" includes both solid and liquid ingestible materials which usually do, but need not, have nutritional value. Thus, foodstuffs include soaps, convenience foods, beverages, dairy products, candies, vegetables, cereals, soft drinks, snacks and the like.

As used herein, the term "medicinal product" includes both solids and liquids which are ingestible non-toxic matterrials which have medicinal value such as cough syrups, cough drops, aspirin and chewable medicinal tablets.

The term "chewing gum" is intended to mean a composition which comprises a substantially water-insoluble, chewable plastic gum base such as chicle, or substitutes therefor, including jelutong, guttakay, rubber or certain comestible natural or synthetic resins or waxes. Incorporated with the gum base in admixture therewith may be plasticizers or softening agents, e.g., glycerine; and a flavoring composition which incorporates one or more of the enol esters of our invention, and in addition, sweetening agents which may be sugars, including sucrose or dextrose and/or artificial sweeteners such as cyclamates or saccharin. Other optional ingredients may also be present.

Substances suitable for use herein as co-ingredients of flavoring adjuvants are well known in the art for such use, being extensively described in the relevant literature. It is a requirement that any such material be "ingestibly" acceptable and thus non-toxic and otherwise non-deleterious particularly from an organoleptic standpoint whereby the ultimate flavor and/or aroma of the consumable material used is not caused to have unacceptable aroma and taste nuances. Such materials may in general be characterized as flavoring adjuvants or vehicles comprising broadly stabilizers, thickeners, surface active agents, conditioners, other flavorants and flavor intensifiers.

Stabilizer compounds include preservatives, e.g., sodium chloride; antioxidants, e.g., calcium and sodium ascorbate, ascorbic acid, butylated hydroxy-anisole (mixture of 2- and 3-tertiary-butyl-4-hydroxy-anisole), butylated hydroxy toluene (2,6-di-tertiary-butyl-4-methyl phenol), propyl gallate and the like and sequestrants, e.g., citric acid.

Thickener compounds include carriers, binders, protective colloids, suspending agents, emulsifiers and the like, e.g., agar agar, carrageenan; cellulose and cellulose derivatives such as carboxymethyl cellulose and methyl cellulose; natural and synthetic gums such as gum arabic, gum tragacanth; gelatin, proteinaceous materials; lipids; carbohydrates; starches, pectins, and emulsifiers, e.g., mono- and diglycerides of fatty acids, skim milk powder, hexoses, pentoses, disaccharides, e.g., sucrose corn syrup and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, tumeric and curcuma and the like; firming agents such as aluminum sodium sulfate, calcium chloride and calcium gluconate; texturizers, anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, formic acid, 2-hexenoic acid, benzoic acid, n-butyric acid, caproic acid, caprylic acid, cinnamic acid, isobutyric acid, isovaleric acid, alpha-methyl-butyric acid, propionic acid, valeric acid, 2-methyl-2-pentenoic acid, and 2-methyl-cis-3-pentenoic acid; ketones and aldehydes, e.g., acetaldehyde, acetophenone, acetone, acetyl methyl carbinol, acrolein, n-butanal, crotonal, diacetyl, 2-methyl butanal, beta,beta-dimethyl-acrolein, methyl-n-amyl ketone, n-hexanal, 2-hexenal, iso-pentanal, hydrocinnamic aldehyde, cis-3-hexenal, 2-heptanal, nonyl aldehyde, 2-phenyl-2-butenal, 4-methyl-2-phenyl-2-pentenal, 5-methyl-2-phenyl-2-hexenal, 4-(p-hydroxyphenyl)-2-butanone, alpha-ionone, beta-ionone, 2-methyl-3-butanone, benzaldehyde, damascone, damascenone, 2-heptanone, o-hydroxyacetophenone, 2-methyl-2-hepten-6-one, 2-octanone, 2-undecanone, 3-phenyl-4-pentenal, 2-phenyl-4-pentenal, 2-phenyl-2-hexenal, 2-phenyl-2-pentenal, furfural, 5-methyl furfural, cinnamaldehyde, isovaleraldehyde, beta-cyclohomocitral, 2-pentanone, 2-pentenal and propanal; alcohols such as 1-butanol, benzyl alcohol, 1-borneol, trans-2-buten-1-ol, ethanol, geraniol, 1-hexanol, 2-heptanol, trans-2-hexenol-1, cis-3-hexen-1-ol, 3-methyl-3-buten-1-ol, 1-pentanol, 1-penten-3-ol, p-hydroxyphenyl-2-ethanol, isoamyl alcohol, isofenchyl alcohol, 2-phenylethanol, alpha-terpineol, cis-terpineol hydrate, eugenol, linalool, acetoin; esters, such as butyl acetate, ethyl acetate, ethyl acetoacetate, ethyl benzoate, ethyl butyrate, ethyl caprate, ethyl caproate, ethyl caprylate, ethyl cinnamate, ethyl crotonate, ethyl formate, ethyl isobutyrate, ethyl isovalerate, ethyl laurate, ethyl myristate, ethyl alpha-methylbutyrate, ethyl propionate, ethyl salicylate, trans-2-hexenyl acetate, hexyl acetate, 2-hexenyl butyrate, hexyl butyrate, isoamyl acetate, isopropyl butyrate, methyl acetate, methyl butyrate, methyl caproate, methyl isobutyrate, alpha-methylphenylglycidate, ethyl succinate, isobutyl cinnamate, cinnamyl formate, methyl cinnamate and terpenyl acetate; hydrocarbons such as dimethyl naphthalene, dodecane, methyl diphenyl, methyl naphthalene, myrcene, naphthalene, octadecane, tetradecane, tetramethyl naphthalene, tridecane, trimethyl naphthalene, undecane, caryophyllene, 1-phellandrene, p-cymene, 1-alphapinene; pyrazines such as 2-methoxy-3-isobutyl pyrazine, 2,3-dimethylpyrazine, 2,5-dimethylpyrazine, 2,6-dimethylpyrazine, 3-ethyl-2,5-dimethylpyrazine, 2-ethyl-3,5,6-trimethylpyrazine, 3-isoamyl-2,5-dimethylpyrazine, 5-isoamyl-2,3-dimethylpyrazine, 2-isoamyl-3,5,6-trimethylpyrazine, isopropyl dimethylpyrazine, methyl ethylpyrazine, tetramethylpyrazine, trimethylpyrazine; essential oils, such as jasmine absolute, cassia oil, cinnamon bark oil, rose absolute, orris absolute, lemon essential oil, Bulgarian rose, yara yara and vanilla; thiazoles such as those set forth in U.S. Pat. No. 3,769,040 including 2,4,5-trimethylthiazole, 2-methyl-5-methoxy-4-isobutylthiazole, 2,4-dimethyl-5-acetylthiazole and 2,4-dimethyl-5-ethylthiazole; thiazolines such as those set forth in U.S. Pat. No. 3,816,445 including 2(2-methylthioethyl)-$\Delta^3$-thiazoline, 2-secondary butyl-$\Delta^3$-thiazoline; 2-n-butyl-$\Delta^3$-thiazoline, 2-isobutyl-$\Delta^3$-thiazoline, 2-pentyl-$\Delta^3$-thiazoline, 2-hexyl-$\Delta^3$-thiazoline and 2-benzyl-$\Delta^3$-thiazoline; lactones such as $\gamma$-nonalactone; sulfides, e.g., methyl sulfide and other materials such as maltol, acetoin and acetals (e.g., 1,1-diethoxy-ethane, 1,1-dimethoxy-ethane and dimethoxymethane).

The specific flavoring adjuvant is selected for use may be either solid or liquid depending upon the desired physical form of the ultimate product, i.e., foodstuff, whether simulated or natural and should, in any event, (i) be organoleptically compatible with the mixture (the product-by-process) containing isobutyl substituted heterocyclic compound mixture of our invention by not covering the organoleptic properties (aroma and/or taste) thereof; (ii) be non-reactive with the mixture containing the isobutyl substituted heterocyclic compound mixture of our invention and (iii) be capable of providing an environment in which the product-by-process containing the mixture of isobutyl substituted heterocyclic compounds of our invention can be dispersed or admixed to provide a homogeneous medium. In addition, selection of one or more flavoring adjuvants, as well as the quantities thereof, will depend upon the precise organoleptic character desired in the finished product. Thus, in the case of flavoring compositions, ingredient selection will vary in accordance with the foodstuff, chewing gum, medicinal product or toothpaste to which the flavor and/or aroma are to be imparted. modified, altered or enhanced. In contradistinction, in the preparation of solid products, e.g., simulated foodstuffs, ingredients capable of providing normally solid compositions should be selected such as various cellulose derivatives.

As will be appreciated by those skilled in the art, the amount of product-by-process containing mixture of isobutyl substituted heterocyclic compounds of our invention employed in a particular instance can vary over a relatively wide range, depending upon the desired organoleptic effects to be achieved. Thus, corresponding, greater amounts would be necessary in those instances wherein the ultimate food composition to be flavored is relatively bland to the taste, whereas relatively minor quantities may suffice for purposes of enhancing the composition merely deficient in natural flavor or aroma. The primary requirement is that the amount selected be effective, i.e., sufficient to alter, modify or enhance the organoleptic characteristics of the parent composition whether foodstuff per se, chewing gum per se, medicinal product per se, toothpaste per se, or flavoring composition.

The use of insufficient quantities of product-by-process containing mixtures of isobutyl substituted heterocyclic compounds of our invention will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus, and with respect to ultimate food compositions, chewing gum compositions, medicinal product compositions and toothpaste compositions, it is found that quantities of product-by-process containing mixtures of substituted heterocyclic compounds of our invention ranging from a small but effective amount, e.g., 0.5 parts per million up to about 100 parts per million based on total composition are suitable. Concentrations in excess of the maximum quantity stated are not normally recommended since they fail to provide commensurate enhancement of organoleptic properties. In those instances, wherein the product-by-process containing the mixture of isobutyl substituted heterocyclic compounds of our invention are added to the foodstuff as integral components of a flavoring composition, it is, of course, essential that the total quantity of flavoring composition employed by sufficient to yield an effective product-by-process concentration in the foodstuff products.

Food flavoring compositions prepared in accordance with the present invention preferably contain the product-by-process containing the mixture of isobutyl substituted heterocyclic compounds of our invention in concentrations ranging from about 0.05% up to about 20% by weight based on the total weight of said flavoring composition.

The composition described herein can be prepared according to conventional techniques well known as typified by cake batters and dairy drinks and can be formulated by merely admixing the involved ingredients with the proportions stated in a suitable blender to obtain the desired consistency, homogeneity of dispersion, etc. Alternatively, flavoring compositions in the form of particulate solids can be conveniently prepared by mixing the product-by-process containing the mixture of isobutyl substituted heterocyclic compounds of our invention with, for example, gum arabic, gum tragacanth, carageenan and the like, and thereafter spray-drying the resultant mixture whereby the particulate solid product is obtained. Pre-prepared flavor mixes in powder form, e.g., a chocolate-flavored powder mix, are obtained by mixing the dried components, e.g., starch, sugar and the like, and the product-by-process containing the mixture of isobutyl substituted heterocyclic compounds of our invention in a dry blender until the requisite degree of uniformity is achieved.

It is presently preferred to combine with the product-by-process containing the mixture of isobutyl substituted heterocyclic compounds of our invention the following adjuvants:
p-Hydroxybenzyl acetone;
Geraniol;
Cassia Oil;
Acetaldehyde;
Maltol;
Ethyl methyl phenyl glycidate;
Benzyl acetate;
Dimethyl sulfide;
Eugenol;
Vanillin;
Caryophyllene;
Methyl cinnamate;
Guaiacol;
Ethyl pelargonate;
Cinnamaldehyde;
Methyl anthranilate;
5-Methyl furfural;
Isoamyl acetate;
Isobutyl acetate;
Cuminaldehyde;
Alpha ionone;
Cinnamyl formate;
Ethyl butyrate;
Acetic acid;
Gamma-undecalactone;
Naphthyl ethyl ether;
Diacetyl;
Furfural;
Ethyl acetate;
Anethole;
2,3-Dimethyl pyrazine;
2-Ethyl-3-methyl pyrazine;
3Phenyl-4-pentenal;
2-Phenyl-2-hexenal;
2-Phenyl-2-pentenal;
3-Phenyl-4-pentenal diethyl acetal;
Damascone (1-crotonyl-2,2,6-trimethylcyclohexen-1-one)
Damascenone (1-crotonyl-2,2,6-trimethylcyclohexa-1,5-diene)
Beta-cyclohomocitral (2,2,6-trimethyl-cyclohex-1-ene carboxaldehyde)
Isoamyl butyrate;
Cis-3-hexenol-1;
2-Methyl-2-pentenoic acid;
Elemecine (4-allyl-1,2,6-trimethoxy benzene);
Isoelemecine (4-propenyl-1,2,6-trimethoxy benzene); and
2-(4-Hydroxy-4-methylpentyl) norborandiene prepared according to U.S. Application for Letters Patent 461,703, filed on Apr. 17, 1974, now U.S. Pat. No. 3,886,289 issued on May 27, 1975
2-Methoxy-3-isobutylpyrazine;
2,4,5-Trimethylthiazole;
2-Methyl-5-methoxy-4-isobutylthiazole;
2,4-Dimethyl-5-acetylthiazole;
2,4-Dimethyl-5-ethylthiazole;
2(2-Methylthioethyl)-$\Delta^3$-thiazoline;
2-Secondary butyl-$\Delta^3$thiazoline;
2-n-Butyl-$\Delta^3$-thiazoline;
2-Isobutyl-$\Delta^3$-thiazoline;
2-Pentyl-$\Delta^3$-thiazoline;
2-Hexyl-$\Delta^3$-thiazoline;
2-Benzyl-$\Delta^3$-thiazoline;
2-Secondary butyl thiazole;
2-n-Butyl thiazole;
2-Phenyl-4-pentenal;
Isovaleraldehyde;
2-Phenyl-2-butenal;
4-Methyl-2-phenyl-2-pentenal;
5-Methyl-2-phenyl-2-hexenal;

The examples following example I illustrate processes for PREPARATION OF MIXTURE CONTAINING ISOBUTYL SUBSTITUTED HETEROCYCLIC COMPOUNDS AND OTHER UNKNOWN INGREDIENTS specifically producing the product-by-process containing the mixtures isobutyl substituted heterocyclic compounds of our invention and also serve to illustrate the organoleptic qualities of said product-by-process containing the mixture of isobutyl substituted heterocyclic compounds of our invention and, in addition, the uses of the product-by-process containing the isobutyl substituted heterocyclic compound mixture of our invention for its organoleptic properties:

EXAMPLE I

PREPARATION OF 2,4,6-TRIISOBUTYL-1,3,5-TRIOXANE

Reaction:

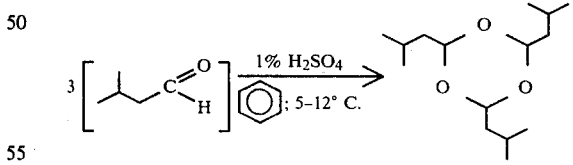

Into a one liter, three-necked reaction flask equipped with mechanical stirrer, condenser, immersion thermometer, "Y" adapter and cold bath is placed 200 ml of isobaleraldehyde and 100 ml of benzene. The resulting mixture is cooled to about 5° C. using a ice-water bath. 2 Grams of concentrated sulfuric acid is then added dropwise to the reaction mixture while it is being agitated using the mechanical stirrer. The reaction mass heats up to a temperature of about 12° C.

The reaction mass is then stirred for a period of 19 hours at temperature of about 22° C. The resulting reaction product is made basic by washing with five 20 ml portions of 5% aqueous sodium hydroxide. The resulting product is then washed to neutral with two 50 ml portions of water. The resulting product is then distilled at 95° C. and 1 mm Hg yielding 2,4,6-triisobutyl-1,3,5-trioxane.

FIG. 1 sets forth the NMR spectrum for the resulting product, 2,4,5-triisobutyl-1,3,5-trioxane.

FIG. 2 sets forth the infrared spectrum for the resulting product, 2,4,6-triisobutyl-1,3,5-trioxane.

FIG. 3 sets forth the mass spectrum for the resulting product, 2,4,6-triiosobutyl-1,3,5-trioxane.

The resulting material, when added to tobacco, gives rise to a chocolate-like, cocoa-like and sweet, creamy flavor and aroma prior to smoking; and a chocolate-like aroma nuance with more tobacco-like nuances on smoking in the main stream and the side stream. In foodstuffs the resultant material gives rise to sweet, dairy-like, creamy, vanilla, berry-like, milk chocolate-like and cocoa butter-like aromas and sweet, dairy-like, creamy, vanilla, berry-like, milk chocolate and cocoa butter-like flavor characteristics.

The resulting 2,4,6-triisobutyl-1,3,5-trioxane is then compared with isovaleraldehyde at about the same intensity insofar as their taste characteristics are concerned:

At the rate of 10 ppm for 2,4,6-triisobutyl-1,3,5-trioxane;

At the rate of 0.1 ppm for isovaleraldehyde.

The 2,4,6-triisobutyl-1,3,5-trioxane has a cocoa/floral aroma and taste as found in dark chocolate. The isovaleraldehyde is substantially weaker in aroma notes at about the same flavor strength for both chemicals. Its aroma and taste characteristics are more cocoa powder-like. Therefore, both chemicals are completely different in their aroma and taste characteristics.

PREPARATION OF MIXTURE CONTAINING ISOBUTYL SUBSTITUTED HETEROCYCLIC COMPOUNDS AND OTHER UNKNOWN INGREDIENTS

Reaction:

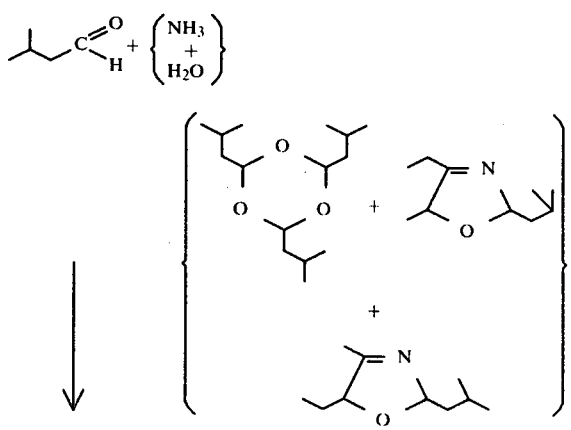

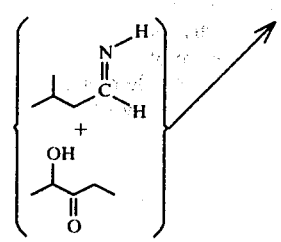

Into a 500 ml reaction flask equipped with mechanical stirrer, 250 ml addition funnel, thermometer, "Y" adapter, Freidrich condenser and isopropanol/dry ice bath is placed 86.2 ml of aqueous ammonia (0.5 moles). The aqueous ammonia is cooled to 3° C. Dropwise, with stirring, is added 43 grams of isovaleraldehyde. On completion of the addition of the isovaleraldehyde, the resulting imine forms a solid mass in the aqueous medium which is dispersed at a temperature of about 35° C. The addition time of the isovaleraldehyde is 1.5 hours.

The resulting reaction mass is stirred for an additional 1.5 hours before the dropwise addition of 51.9 grams of 2(3)-hydroxy-3(2)-pentanone. The reaction between the 2(3)-hydroxy-3(2)-pentanone and the imine is carried out for a period of two hours. The resulting reaction mass now exists in two phases. The aqueous phase is extracted with three 100 ml portions of diethyl ether and combined with the organic phase. The combined organic phases are then washed with three 100 ml portions of saturated sodium chloride solution.

This reaction product is utilized for its organoleptic properties in subsequent examples herein infra.

The resulting product may, if desired, be fractionally distilled at 110° C. and 10 mm Hg pressure to yield a large number of products and mixtures of same, several of which are non-identifiable but one of which is 2,4,6-triisobutyl-1,3,5-trioxane.

The NMR spectrum for 2,4,6-triisobutyl-1,3,5-trioxane is set forth in FIG. 1. The IR spectrum for 2,4,6-triisobutyl-1,3,5-trioxane is set forth in FIG. 2. The mass spectrum for 2,4,6-triisobutyl-1,3,5-trioxane is set forth in FIG. 3.

The mass spectrum is as follows:

| m/e | Relative intensity |
|---|---|
| 41 | 19 |
| 43 | 35 |
| 44 | 12 |
| 45 | 16 |
| 57 | 20 |
| 69 | 69 |
| 71 | 16 |
| 85 | 27 |
| 87 | 100 |
| 173 | 41 |
| 258 | 0 |

FIG. 4 represents the NMR spectrum for 5-ethyl-4-methyl-2-isobutyl-3-oxazoline resulting from distillation of fraction 2-5 followed by GLC preparative chromatography on Carbowax 20M. FIG. 5 represents the infrared spectrum for 5-ethyl-4-methyl-2-isobutyl-3-oxazoline. FIG. 6 represents the mass spectrum for 5-ethyl-4-methyl-2-isobutyl-3-oxazoline.

FIG. 7 represents the NMR spectrum for 4-ethyl-5-methyl-2-isobutyl-3-oxazoline which is peak 1 separated from fraction 2-5 by preparative GLC using a Carbowax 20M column. FIG. 8 represents the infrared spectrum for 4-ethyl-5-methyl-2-isobutyl-3-oxazoline. FIG. 9 represents the mass spectrum for 4-ethyl-5-methyl-2-isobutyl-3-oxazoline.

EXAMPLE III

COCOA FLAVOR

The following basic cocoa formulation is prepared by admixing the following ingredients:

| Ingredients | Parts by Weight |
|---|---|
| Vanillin | 6.5 |
| Amylphenyl acetate | 3.5 |
| Benzyl butyrate | 0.5 |
| Veratraldehyde | 0.5 |
| 5-Methyl-2-phenyl-2-hexenal | 3.0 |
| Isovaleraldehyde | 4.0 |
| Isobutyraldehyde | 1.0 |
| Benzaldehyde | 0.2 |
| 5-Methyl furfural | 0.8 |
| Propylene glycol | 80.0 |

The foregoing flavor formulation is divided into portions. To the first portion, 10% by weight of a mixture of compounds prepared according to Example II is added. Nothing is added to the second portion. Both flavors are compared at the rate of 20 ppm in water. The flavor containing the product-by-process has a characteristic cocoa note and green burnt nuances, both in aroma and taste. This characteristic cocoa note is missing in the basic flavor formulation without said product-by-process contained therein. Therefore, a bench panel, composed of three individuals, prefers the formulation which contains the product-by-process which further contains the mixture of isobutyl substituted heterocyclic compounds.

EXAMPLE IV

CHOCOLATE FORMULATION

The following basic chocolate formulation is prepared:

| Ingredient | Parts by Weight |
|---|---|
| Maltol | 0.30 |
| Isobutyraldehyde | 1.50 |
| Isovaleraldehyde | 4.20 |
| Propylene glycol | 3.00 |
| Dimethyl sulfide | 0.05 |
| Isobutyl acetate | 0.10 |
| Isoamyl acetate | 0.20 |
| Phenylethyl acetate | 0.05 |
| Diacetyl (10% in food grade ethyl alcohol) | 0.05 |
| Furfural (10% in food grade ethyl alcohol) | 0.10 |
| Benzaldehyde | 0.10 |
| Isoamyl alcohol | 0.05 |
| Phenylethyl alcohol | 0.30 |

In addition, a chocolate-like flavor composition is prepared with the following ingredients:

| Ingredients | Parts by Weight |
|---|---|
| Trimethylthiazole (10% in food grade ethyl alcohol) | 2.0 |
| Tetramethylpyrazine | 4.0 |
| Product-by-process containing isobutyl substituted heterocyclic compound mixture (prepared) according to Example II) | 2.0 |
| Food grade ethanol | 2.0 |

The basic chocolate formulation is divided into two portions. To a first portion, 10% by weight of the "chocolate-like flavor composition" containing the product-by-process produced according to Example II and containing a mixture of isobutyl substituted heterocyclic compounds including 2,4,6-triisobutyl-1,3,5-trioxane is added. To the second portion, nothing is added. Both flavors with and without additional material are compared at the rate of 20 ppm in water. The flavor with the additional "chocolate-like flavor composition" has a full dark chocolate aroma and taste with green, bitter undertones which are considered to be highly desirable. These notes are missing in the basic formulation without the addition of the "chocolate-like flavor composition". The added "chocolate-like flavor composition" causes the "basic chocolate formulation" to be preferred by a bench panel composed of three individuals.

EXAMPLE V

COCOA FLAVOR

The following basic cocoa formulation is prepared:

| | Percent |
|---|---|
| Snowlite I | 20 |
| Britesil ® hydrous silicate particles (18% H₂O, Na₂O:SiO₂ ratio of 1:2, mfd. by Philadelphia Quartz Company) | 10 |
| Neodol 25-7 | 15 |
| Type 4A zeolite (Zeolite CH-252-91-1, mfd. by J. M. Huber Corp.) | 55 |

The above basic cocoa formulation is divided into two portions. To a first portion, 7.5% by weight of a mixture prepared according to Example II containing a mixture of isobutyl substituted heterocyclic compounds is added. To the second portion, nothing is added. Both flavor formulations with and without the additional product-by-process are compared at the rate of 20 ppm in water. The flavor containing the product-by-process has a deeper, cocoa character, more mouthfeel and a "light hydrolyzed vegetable protein-like" note. It is therefore preferred by a bench panel composed of three individuals.

What is claimed is:

1. A mixture containing 2,4,6-triisobutyl-1,3,5-trioxane having the formula:

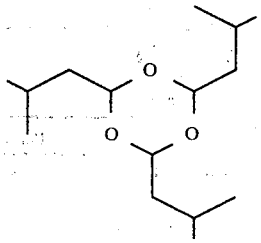

and a mixture of oxazoline compounds having the generic structure:

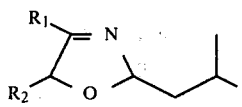

wherein $R_1$ and $R_2$ are different and each is selected from the group consisting of ethyl and methyl, produced according to the process of admixing aqueous ammonia with isovaleraldehyde at a temperature in the range of from about 0° C. up to about 10° C., whereby the reaction of aqueous ammonia with isovaleraldehyde is carried out using a mole ratio of isovaleraldehyde: ammonia of from 0.5:1 up to 2:1 thereby producing an imine; then raising the temperature of the resulting reaction mass to 35° C. thereby dispersing the resulting imine; then while maintaining the reaction mass in the same reactor admixing the resulting reaction mass with 2-hydroxy-3-pentanone or 3-hydroxy-2-pentanone or a mixture thereof at a temperature in the range of from about 30° C. up to about 50° C. over a period of time of from 1 up to 10 hours whereby the reaction mass exists in two phases; an aqueous phase and an organic phase; extracting the aqueous phase with an inert solvent; combining the resulting extract with the organic phase; and evaporating the inert solvent from the organic phase.

2. A composition useful in augmenting or enhancing the cocoa aroma or taste of a foodstuff comprising (i) from 0.05% up to 15% by weight based on the total weight of said flavoring composition of the product of claim 1 and (ii) the remainder of said formulation being an adjuvant for said product of claim 1 compatible with said foodstuff and being selected from the group consisting of:
p-Hydroxybenzyl acetone;
Geraniol;
Cassia Oil;
Acetaldehyde;
Maltol;
Ethyl methyl Phenyl glycidate;
Benzyl acetate;
Dimethyl sulfide;
Eugenol;
Vanillin;
Caryophyllene;
Methyl cinnamate;
Guaiacol;
Ethyl pelargonate;
Cinnamaldehyde;
Methyl anthranilate;
5-Methyl furfural;
Isoamyl acetate;
Isobutyl acetate;
Cuminaldehyde;
Alpha ionone;
Cinnamyl formate;
Ethyl butyrate;
Acetic acid;
Gamma-undecalactone;
Naphthyl ethyl ether;
Diacetyl;
Furfural;
Ethyl acetate;
Anethole;
2,3-Dimethyl pyrazine;
2-Ethyl-3-methyl pyrazine;
3-Phenyl-4-pentenal;
2-Phenyl-2-hexenal;
2-Phenyl-2-pentenal;
3-Phenyl-4-pentenal diethyl acetal;
1-crotonyl-2,2,6-trimethyl-cyclohex-1-ene;
1-crotonyl-2,2,6-trimethyl-cyclohexa-1,5-diene;
2,2,6-trimethyl-cyclohexen-1-carboxaldehyde;
Isoamyl butyrate;
Cis-3-hexenol-1;
2-Methyl-2-pentenoic acid; 4-Allyl-1,2,6-trimethoxy benzene;
4-Propenyl-1,2,6-trimethoxy benzene;
2-(4-Hydroxy-4-methylpentyl)norbornadiene;
2-Methoxy-3-isobutylpyrazine;
2,4,5-Trimethylthiazole;
2-Methyl-5-methoxy-4-isobutylthiazole;
2,4-Dimethyl-5-acetylthiazole;
2,4-Dimethyl-5-ethylthiazole;
2(2-Methylthioethyl)-$\Delta^3$-thiazoline;
2-Secondary butyl-$\Delta^3$-thiazoline;
2n-Butyl-$\Delta^3$-thiazoline;
2-Isobutyl-$\Delta^3$-thiazoline;
2-Pentyl-$\Delta^3$-thiazoline;
2-Hexyl-$\Delta^3$-thiazoline;
2-Benzyl-$\Delta^3$-thiazoline;
2-Secondary butyl thiazole;
2-n-Butyl thiazole;
2-Phenyl-4-pentenal;
Isovaleraldehyde;
2-Phenyl-2-butenal;
4-Methyl-2-phenyl-2-pentenal;
5-Methyl-2-phenyl-2-hexenal;

3. A process for augmenting or enhancing the cocoa aroma or taste of a foodstuff comprising the step of adding to said foodstuff from 0.5 ppm up to about 100 ppm based on the total composition of the product of claim 1.

* * * * *